(12) United States Patent  
Hepkin et al.

(10) Patent No.: US 7,747,838 B2  
(45) Date of Patent: Jun. 29, 2010

(54) METHOD AND APPARATUS FOR DYNAMICALLY ADJUSTING PAGE SIZE IN A VIRTUAL MEMORY RANGE

(75) Inventors: David Alan Hepkin, Austin, TX (US); Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 11/751,005

(22) Filed: May 19, 2007

(65) Prior Publication Data

US 2008/0288742 A1      Nov. 20, 2008

(51) Int. Cl.  
*G06F 12/12* (2006.01)

(52) U.S. Cl. ..................................................... 711/209

(58) Field of Classification Search ........................ None  
See application file for complete search history.

(56) References Cited

U.S. PATENT DOCUMENTS 6,378,059 B1* 4/2002 Miyoshi ..................... 711/203
6,766,424 B1* 7/2004 Wilson ....................... 711/148
7,284,112 B2* 10/2007 Bradford et al. ............. 711/206
2006/0161758 A1* 7/2006 Bradford et al. ............. 711/202
2006/0288187 A1  12/2006 Burugula et al.
2007/0186074 A1* 8/2007 Bradford et al. ............. 711/202

OTHER PUBLICATIONS

"Superpages", pp. 1-7, retrieved May 14, 2007 http://www.stanford.edu/~stinson/cs240/cs240_1/revs/superpages.txt.

* cited by examiner

*Primary Examiner*—Kevin Verbrugge  
(74) *Attorney, Agent, or Firm*—Yee & Associates, P.C.; Matthew W. Baca

(57) ABSTRACT

The illustrative embodiments described herein provide a computer implemented method, apparatus, and computer program product for adjusting a page size for a virtual memory range. The process identifies a set of pages in the virtual memory range that reside on a primary memory to form a page occupancy. Each of the set of pages has a first page size. The process changes the first page size to a second page size in response to a comparison of the page occupancy to a threshold value indicating that the first page size should be adjusted.

18 Claims, 5 Drawing Sheets

METHOD AND APPARATUS FOR DYNAMICALLY ADJUSTING PAGE SIZE IN A VIRTUAL MEMORY RANGE

BACKGROUND OF THE INVENTION

1. Field of the Invention

The present invention relates generally to a data processing system and in particular to a method and system for virtual memory. More particularly, the present invention is directed to a computer implemented method, apparatus, and computer-usable program code for adjusting the page size in a virtual memory range.

2. Description of the Related Art

Many modern operating systems use a page-based virtual memory architecture in which virtual memory is mapped to primary memory, such as random access memory, in units of fixed-page size. Primary memory may also be referred to as main memory. Page-based virtual memory refers to the process of managing program access to virtual memory pages that do not currently reside in a primary memory. A virtual memory page resides on primary memory when the virtual memory page is translated to primary memory. A virtual memory page is translated to the primary memory when the virtual memory page is referenced by an application.

Some computer architectures and operating systems provide support for multiple page sizes. Larger page sizes can improve the performance of hardware translation mechanisms because they allow hardware translation caches to translate larger amounts of memory. However, operating systems that support multiple different page sizes face the problem of choosing the optimal page size for a workload. Current operating systems attempt to solve this problem in a number of different ways.

Some operating systems use the largest supported page size at all times regardless of system conditions. However, using the largest page size at all times can waste memory resources by creating a needlessly large memory footprint for a workload. For example, an application that declares an array of data that is 64K bytes in size may only use the first 8K bytes of the array. However, if an operating system maps the entire 64K byte range with a 64K byte page, the range would consume a full 64K bytes of primary memory even though only 8K bytes of the data array is used. Hence, memory resources are wasted by this method.

Another current method implemented by some operating systems allows a user or application developer to select a static page size via an application programming interface (API) or environmental variable. However, allowing a user or application developer to select a static page size for an application using an API requires that the application be modified and re-compiled in order to use the API. Also, when a larger page size is selected using this method, applications that expect a smaller page size may fail when performing some page-level operations, such as setting page protections using the mprotect( ) function. Another disadvantage to this method is that the page selection is static and does not respond to changing system conditions, such as whether the primary memory is over-committed.

Another currently available method samples an application workload and then makes a page size decision based on the sampled workload data. In this method, performance metrics, such as translation cache misses, are gathered. When the application is re-run, larger page sizes are used for the selected memory pages based on the performance metrics that were gathered during the previous run of the application. However, this method has the disadvantage of having to run an application multiple times to determine an optimal page size to use for the application. Also, gathering performance metrics for an application can be an inconvenient and burdensome task. Furthermore, this method can only be used to select page sizes for an application at the time the application is started, as opposed to dynamically selecting pages sizes during application runtime. Therefore, this method represents a static approach to selecting a page size.

SUMMARY OF THE INVENTION

The illustrative embodiments described herein provide a computer implemented method, apparatus, and computer program product for adjusting a page size for a virtual memory range. In one embodiment, the process identifies a set of pages in the virtual memory range that reside on a primary memory to form a page occupancy. The set of pages has a first page size. The process changes the first page size to a second page size in response to a comparison of the page occupancy to a threshold value indicating that the first page size should be adjusted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
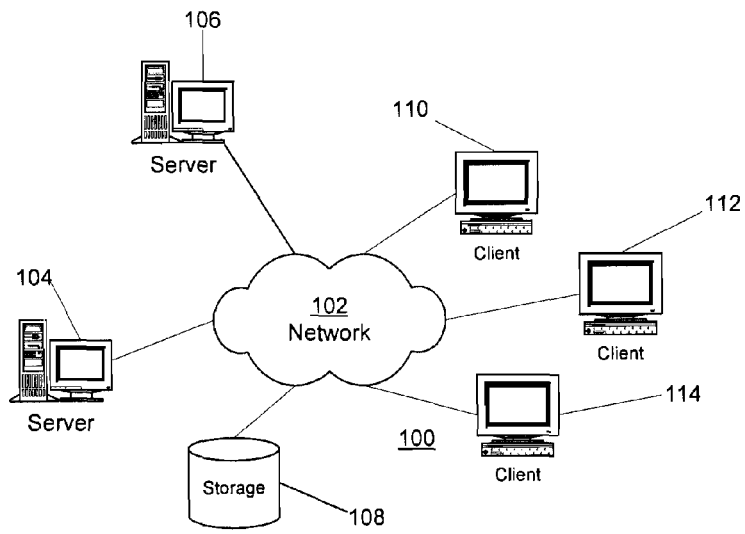
FIG. 1 is a pictorial representation of a network data processing system in which the illustrative embodiments may be implemented.
Figure 2:
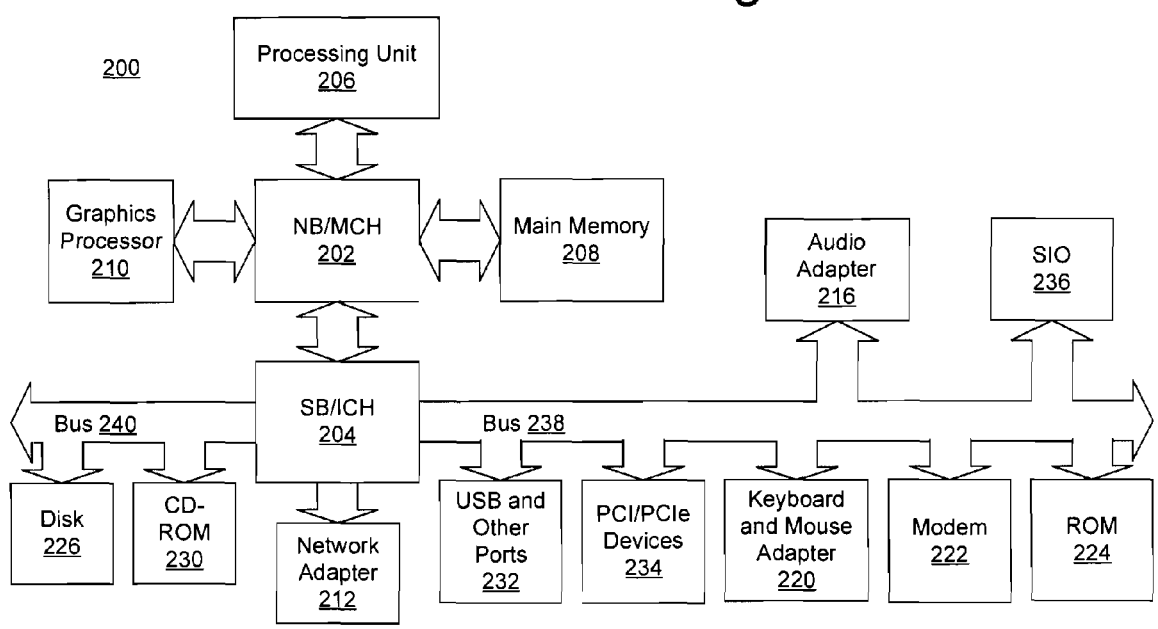
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In this example, server 104 and server 108 use a page-based virtual memory architecture in which virtual memory is mapped to primary memory, such as random access memory, in units of fixed-page size.

In addition, clients 110, 112, and 114 connect to network 102. Clients 110, 112, and 114 may be, for example, personal computers or network computers. Clients 110, 112, and 114 may also support a page-based virtual memory architecture. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide a computer implemented method, apparatus, and computer program product for adjusting a page size for a virtual memory range. In one embodiment, the process identifies a set of pages in the virtual memory range that reside on a primary memory to form a page occupancy. The set of pages is a set of one or more pages in these examples. The set of pages has a first page size. The process changes the first page size to a second page size in response to a comparison of the page occupancy to a threshold value indicating that the first page size should be adjusted.

The second page size is a different size than the first page size. In one embodiment, the second page size is larger than the first page size. In another example, the second page size is smaller than the first page size.

In one embodiment, the page occupancy is compared to a single threshold value to determine whether the first page size should be adjusted. This determination may be made by comparing the page occupancy with the threshold value to determine if the page occupancy is equal to or greater than the threshold value.

In another embodiment, multiple threshold values are supported. In such a case, the page occupancy is compared to a first threshold value in a set of threshold values to determine if the first page size should be adjusted. After adjusting the first page size to the second page size, the process compares the page occupancy associated with the second page size to a second threshold value. The process changes the second page size to a third page size in response to the second comparison of the page occupancy to the second threshold value in the set of threshold values if the comparison indicates that the second page size should be adjusted.

In this example, the third page size is a different page size than the first page size and the second page size. This process may continued iteratively to compare the page occupancy to different threshold values in the set of threshold vales until the page size is adjusted to a maximum page size and/or until the page size is adjusted to a minimum page size.

Figure 3:
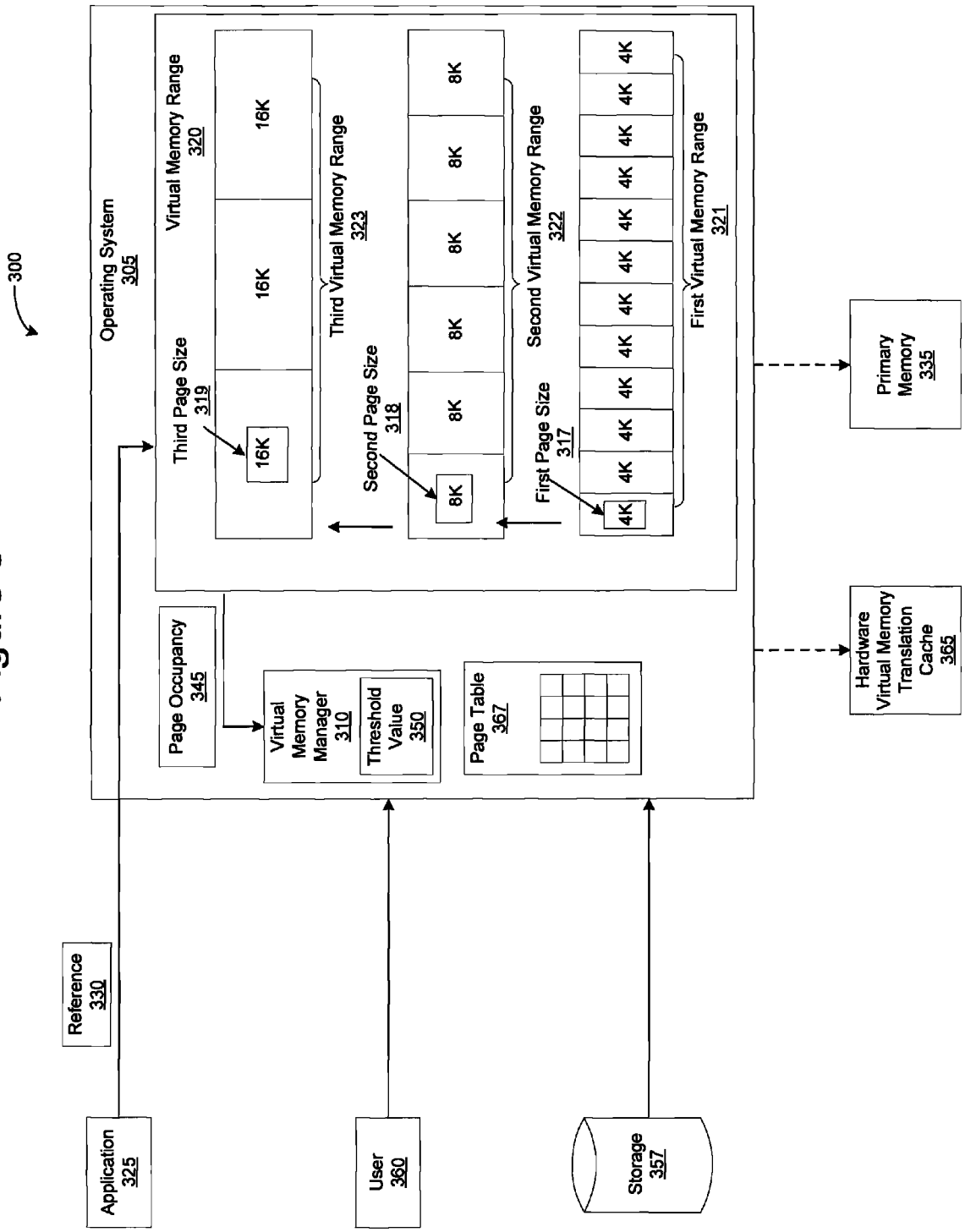
FIG. 3 is a block diagram of a system for adjusting the page size in a virtual memory range in accordance with an illustrative embodiment.

Turning now to FIG. 3, a block diagram of a system for adjusting the page size in a virtual memory range is depicted in accordance with an illustrative embodiment. Data processing system 300 is a data processing system, such as data processing system 100 in FIG. 1.

Data processing system 300 may be implemented in any type of computing device, such as server 104 or client 110 in FIG. 1, or data processing system 200 in FIG. 2. Data processing system 300 includes operating system 305. Operating system 305 is a software component on data processing system 300 for managing hardware and software resources on data processing system 300. Operating system 305 includes virtual memory manager 310.

Virtual memory manager 310 manages the pages in virtual memory range 320. Virtual memory range 320 is a set of virtual memory pages that allows non-contiguous memory in primary memory 335 to be addressed as if the memory is contiguous. Virtual memory range 320 may have different states depending upon the page size of pages associated with virtual memory range 320. For example, first virtual memory range 321, second virtual memory range 322, and third virtual memory range 323 represent three states of virtual memory range 320. The transition between these three states will be discussed in further detail below.

Application 325 makes reference 330 to virtual memory range 320. Application 325 may be any application that utilizes virtual memory, such as an executable. Application 325 may also include one or more processes that are in the process of executing. Although application 325 is shown in FIG. 3 as part of data processing system 300, application 325 may be located on a remote computing device at remote location, such as clients 110, 112, and 114 in FIG. 1. Application 325 may be connected to operating system 305 by a network, such as network 102 in FIG. 1.

Although FIG. 3 depicts application 325 as referencing one virtual memory range, application 325 may reference more than one virtual memory range. For example, multiple processes associated with an application 325 may each reference different virtual memory ranges.

In addition, one or more memory objects that are associated with application 325 may each reference one or more virtual memory ranges. Non-limiting examples of a memory object include a shared memory region, process data, process stack, memory mapped file.

Operating system 305 initiates virtual memory ranges for applications, processes, and memory objects in a variety of ways. For example, operating system 305 may divide a memory object into equal-sized ranges based on the largest page size supported by the operating system. Operating system 305 may then sub-divide each of the ranges associated with a memory object into pages that are equal to the smallest page size supported by operating system 305. First virtual memory range 321 is a non-limiting example of a virtual memory range that has been initiated based on the smallest page size supported by operating system 305.

Although FIG. 3 depicts virtual memory range 320 as 48 Kbytes in size, virtual memory range 320 may be any size supported by operating system 305. For example, in an operating system in which the largest supported page size is 2 Mbytes, a virtual memory range of 2 Mbytes may be initiated. The 2 Mbyte virtual memory range may then be further sub-divided into smaller page sizes that are supported by the operating system.

When application 325 is initiated, virtual memory manager 310 maps virtual memory range 320 as first virtual memory range 321. Each page in first virtual memory range 321 has a first page size 317. Specifically, virtual memory manager 310 maps first page size 317, which is 4 Kbytes, to virtual memory range 320. Mapping a page size refers to setting, selecting, defining, or otherwise enforcing a particular page size for virtual memory pages in virtual memory range 320. Although FIG. 3 depicts first virtual memory range 321 as having 4 Kbyte pages, first virtual memory range 321 may contain pages of any size. For example, first virtual memory range 321 may contain pages that are the smallest page size supported by operating system 305. Furthermore, although FIG. 3 depicts first virtual memory range 321 as having pages of uniform size, each of the pages contained in first virtual memory range 321 may have a different page size.

Each page in virtual memory range 320 that is referenced by application 325 is translated into primary memory 335. Primary memory 335 may be any memory able to store pages that have been translated from virtual memory range 320. For example, primary memory 335 may be implemented in a memory such as, without limitation, random access memory or main memory, such as main memory 208 in FIG. 2.

As stated above, when application 325 is initiated, virtual memory manager 310 maps virtual memory range 320 as first virtual memory range 321. Each page in first virtual memory range 321 that is referenced by application 325 is translated onto primary memory 335 and, therefore, resides on primary memory 335. The set of pages in virtual memory range 320 that resides in primary memory 335 is called the page occupancy. Alternatively, the page occupancy may be the set of pages in a subset of virtual memory range 320 that reside in primary memory 335.

The page occupancy may be expressed in a variety of ways. For example, the page occupancy may be expressed as a number of pages in a virtual memory range that are resident on a primary memory, or a percentage or fraction that indicates the number of pages in a virtual memory range that are resident on primary memory.

Virtual memory manager 310 identifies page occupancy 345 of first virtual memory range 321. The page occupancy is identified by determining the number of pages in first virtual memory range 321 that are resident on primary memory 335. The number of pages in first virtual memory range 321 depends on the number of pages in first virtual memory range 321 that have been referenced by application 325.

Virtual memory manager 310 makes a comparison of page occupancy 345 for first virtual memory range 321 to threshold value 350. Threshold value 350 is any threshold that indicates that first page size 317 of first virtual memory range 321 should be adjusted. Threshold value 350, also referred to as a page promotion threshold, may be expressed as a percentage, a fraction, a number, or any other value or expression that indicates a threshold at which first page size 317 should be adjusted. For example, threshold value 350 may be 0.25, 50 percent, 100 percent, or 5.

Threshold value 350 may be determined or identified in a variety of ways. In this embodiment, threshold value 350 is a user-definable value. Specifically, threshold value 350 is received, selected, indicated, or otherwise defined by user 360. User 360 may indicate or select threshold value 350 using a user interface to input data to data processing system 300. The user interface may be any type of known or available interface, such as, without limitation, a graphical user interface (GUI), a menu-driven interface, a command-line interface, a touch screen, an alphanumeric keyboard, a speech recognition system interface, or any other type of interface for a user to input data or a selection into data processing system 300.

In another embodiment, threshold value is a pre-defined or default threshold value. In this example, threshold value 350 is received or retrieved from storage 357. In this example, storage 357 is shown as a local storage device to data processing system 300. However, in another embodiment, storage 357 is remote storage device, such as storage 108 in FIG. 1. Threshold value may also be a default value that is provided by operating system 305 or other source.

In another illustrative embodiment, the threshold value is also indicated at varying granularities. Granularity refers to the number of virtual memory ranges controlled by a threshold value. In one level of granularity, a single threshold value may control all virtual memory ranges for all applications on a system. In another level of granularity, a different threshold value may be used to control the virtual memory ranges for each individual application. At this level, an application's threshold value would apply to all virtual memory ranges associated with the application. At another level of granularity, a different threshold value may be used for each individual virtual memory range. At this level, different virtual memory ranges of an application may have different threshold values.

In one embodiment, all three levels of granularity may be implemented. For example, a system-wide tunable may be provided to allow the threshold value to be set at a system level. A tunable is a user-controlled setting, such as a user-controlled setting for operating system 305. The system-wide tunable applies to all processes and kernel memory on the system.

User 360 may control threshold value 350 at the system level via a system tunable. The system level tunable may provide a default value for threshold value 350 that triggers a change from first page size 317 to second page size 318 for all processes and kernel memory. The default value for threshold value 350 may be over-written via process-specific tunables. For example, the default value for threshold value 350 may be over-written using process environmental variables or process application programming interfaces The threshold value may also be indicated at the process level. For example, the threshold may be set by an environment variable. An application programming interface (API) may also be provided that allows an application to specify the threshold value for specific memory ranges in a process.

Virtual memory manager 310 may make the comparison of page occupancy 345 for first virtual memory range 321 to threshold value 350 in a variety of different ways. For example, virtual memory manager 310 may identify that the page occupancy is equal to the threshold value, greater than the threshold value, and/or less than the threshold value. Further examples of the comparison of page occupancy 345 for first virtual memory range 321 to threshold value 350 will be shown in FIG. 4 and FIG. 5 below.

In response to making a comparison of page occupancy 345 for first virtual memory range 321 to threshold value 350 that indicates that first page size 317 should be adjusted, virtual memory manager 310 changes first page size 317 for the pages in first virtual memory range 321 to second page size 318. Changing first page size 317 to second page size 318 refers to adjusting, re-mapping, promoting, altering, modifying, re-setting, or otherwise changing first page size 317 from one size to a different size. Hence, virtual memory range 320 changes state from first virtual memory range 321 to second virtual memory range 322.

In this example, second page size 318 is larger than first page size 317. Although FIG. 3 depicts second page size 318 as 8 Kbytes, second page size 318 may be any other page size that is supported by operating system 305.

Virtual memory manager 310 continues to identify the page occupancy of second virtual memory range 322. In one illustrative embodiment, threshold value 350 is a first threshold value in a set of threshold values. The set of threshold values includes at least one threshold value. Virtual memory manager 310 makes a second comparison of page occupancy 345 to a second threshold value in the set of threshold values indicating that the second page size 318 should be adjusted. In response to making the second comparison, virtual memory manager 310 changes second page size 318 to a different page size, such as third page size 319.

In this example, third page size 319 is larger than second page size 318. Although FIG. 3 depicts third page size 319 as 16 Kbytes, third page size 319 may be any other page size that is supported by operating system 305.

Operating system 305 also communicates with hardware virtual memory translation cache 365. Hardware virtual memory translation cache 365 translates virtual memory address to physical memory address. A non-limiting example of hardware virtual memory translation cache 365 includes a translation lookaside buffer. Also, hardware virtual memory translation cache may be implemented as a software component.

Hardware virtual memory translation cache 365 includes a finite number of entries. As each page in virtual memory range 320 is referenced by application 325, a new entry is created in hardware virtual memory translation cache 365. However, because hardware virtual memory translation cache 365 has a finite number of entries, existing entries in hardware virtual memory translation cache 365 may have to be deleted to allow space for new entries.

A "miss" results when data processing system 300 fails to locate a particular page in hardware virtual memory translation cache 365. When a miss occurs, data processing system 300 must locate the missing page in page table 367. Page table 367 contains entries for all pages referenced in operating system 305. However, locating a page on a page table 367 can require a large amount of computing resources.

By changing the page size to a larger page size as shown above, fewer entries are created in hardware virtual memory translation cache 365. Because fewer entries are created in hardware virtual memory translation cache 365, fewer entries need to be deleted to make room for the new entries. Therefore, a miss is less likely to occur when the page size is increased from first page size 317 to second page size 318 or second page size 318 to third page size 319.

Although FIG. 3 depicts changing the page size for a single virtual memory range 320 that is being referenced by a single application 325, the page size may be changed for all virtual memory ranges referenced by an application. In addition, the page size may be changed for less than all of the virtual memory ranges associated with an application. Also, as described in further detail in FIG. 4, the page size may be changed for less than all of the pages in a virtual memory range.

For example, application 325 may be associated with more than one process that, in turn, references different parts of a data region. A portion of a process's data region that is highly referenced, and therefore has a high page occupancy, may have a larger page size for the virtual memory ranges referenced in that particular portion. Conversely, a portion of a process's data region that is sparsely referenced, and therefore has a low page occupancy, may have a smaller page size for the virtual memory ranges referenced in that particular portion. By distinguishing between different portions of a process's data region, the highly referenced portions of a process's memory area may benefit from larger page sizes without wasting memory mapping sparsely referenced portions of a process's memory area.

In order to make the adjustment of pages sizes transparent to application 325, operating system 305 may identify whether the pages that are being increased in size have the same virtual memory state. An example of pages that have the same virtual memory state are pages that have the same page protections. Operating system 305 may also decrease the page size of a virtual memory range if the operating system detects virtual memory operations that function on page boundaries in the virtual memory range, such as page protection functions. This ensures that application 325 can continue to do virtual memory operations at a granularity of the minimum supported page size for data processing system 300.

To provide an example, in a data processing system in which 4 Kbyte and 64 Kbyte page sizes are supported, an operating system may provide a virtual memory range in a process's data region with 64 Kbyte pages based on the page occupancy for the virtual memory range. However, if the associated application then used the mprotect( ) system call to change the protections of a 4 Kbyte portion of the virtual memory range, the operating system would change the page size to 4 Kbytes, thereby honoring the page protection request at the expected 4 Kbyte granularity. The change to a smaller page size is entirely transparent to the user. Further, the operating system may later provide the virtual memory range with larger pages if the page protections for the virtual memory range are changed such that the page protections across all 4 Kbyte pages are uniform.

Furthermore, operating system 305 may identify whether primary memory 335 is over-committed to provide an additional degree of adaptability to the conditions of data processing system 300. In response to identifying that primary memory 335 is over-committed, operating system 305 may prevent virtual memory manager 310 from increasing the page size of virtual memory range 320. Operating system 305 may also reduce the page sizes in virtual memory range 320.

In addition, virtual memory manager 310 may revert back to a default page size, such as first page size 317, upon receiving instructions from application 325, user 360, or some other source. Virtual memory manager 310 may also revert back to a default page size if data processing system 300, virtual memory manager 310, or operating system 305 is shut down or turned-off.

Figure 4:
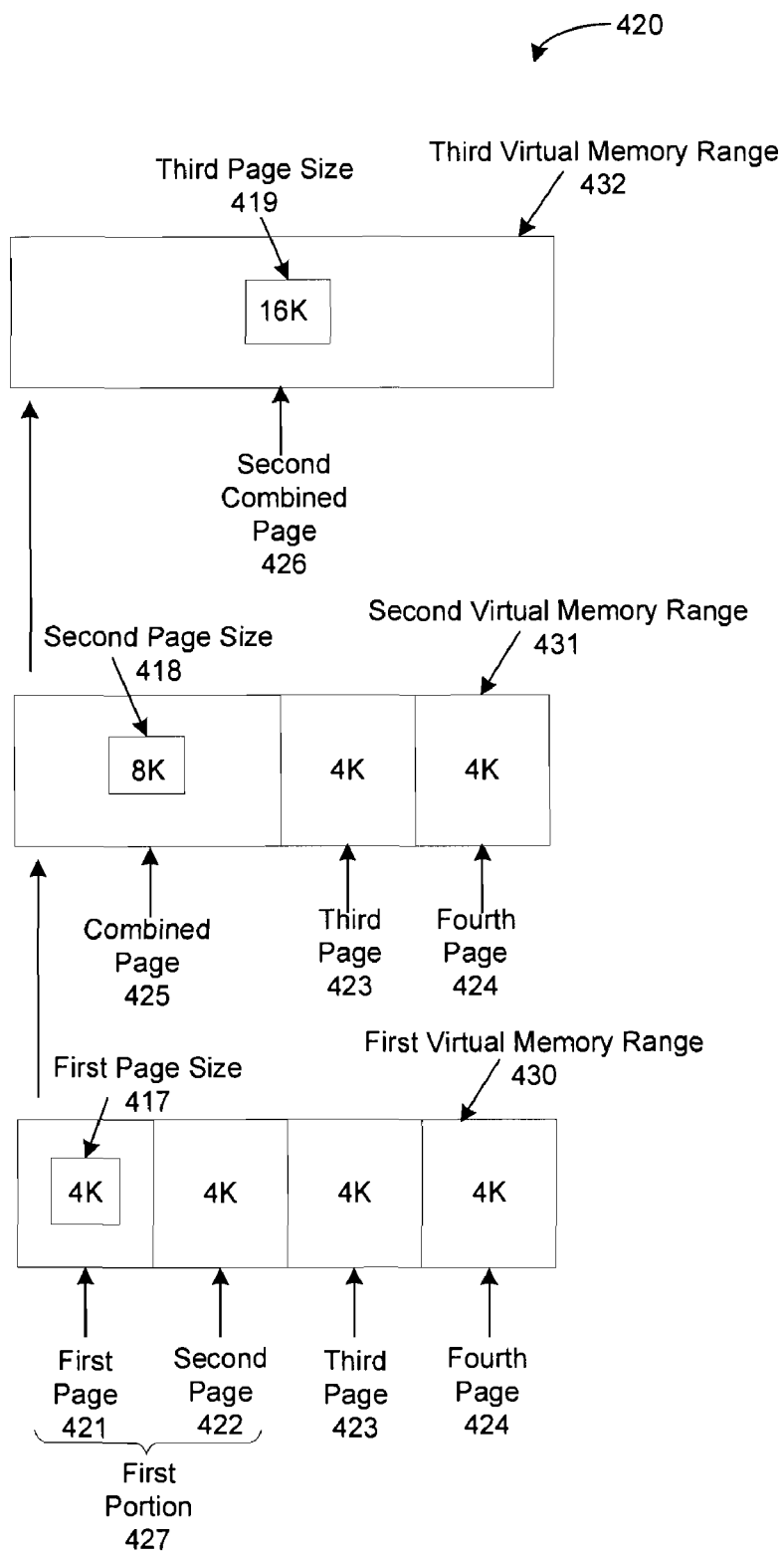
FIG. 4 is a block diagram of a system for adjusting the page size in a virtual memory range in accordance with an illustrative embodiment.

With reference now to FIG. 4, a block diagram of a system for adjusting the page size in a virtual memory range is depicted in accordance with an illustrative embodiment. Specifically, first virtual memory range 430, second virtual memory range 431, and third virtual memory range 432 represent three states of virtual memory range 420. Alternatively, virtual memory range 420 may represent a portion of a virtual memory range.

Similar to virtual memory range 320 in FIG. 3, virtual memory range 420 may be implemented in an operating system, such as operating system 305 in FIG. 3. Virtual memory range 420 may also be controlled by a virtual memory manager, such as virtual memory manager 310 in FIG. 3, and subject to threshold values, such as threshold value 350 in FIG. 3.

A virtual memory manager may identify the page occupancy of either first virtual memory range 430 or a portion of first virtual memory range 430. A virtual memory manager makes a comparison of the page occupancy for first virtual memory range 430 or a portion of first virtual memory range 430 to a threshold value. In response to the comparison indicating that first page size 417 should be adjusted, a virtual memory manager changes first page size 417 for first page 421 and second page 422 to result in combined page 425 having second page size 418.

The virtual memory manager may make the comparison of the page occupancy for first virtual memory range 430 or a portion of first virtual memory range 430 to a threshold value in a variety of different ways. In one embodiment, the virtual memory manager may identify that the page occupancy for first virtual memory range 430 or a portion of first virtual memory range 430 is equal to a threshold value, greater than a threshold value, and/or less than a threshold value. For example, a virtual memory manager may change first page size 417 for first page 421 and second page 422 to second page size 418 of combined page 425 in response to the page occupancy of first portion 427 of first virtual memory range 430 reaching 100 percent. In an alternate example, a virtual memory manager may change first page size 417 for first page 421 and second page 422 to second page size 418 of combined page 425 in response to the page occupancy of first virtual memory range 430 reaching 50 percent The virtual memory manager may then make a second comparison of the page occupancy for first virtual memory range 430 or a portion of first virtual memory range 430 to a second threshold value in a set of threshold values indicating that the pages sizes of combined page 425, third page 423, and fourth page 424 should be adjusted. For example, the second comparison made by the virtual memory manager may identify that the page occupancy of second virtual memory range 431 has reached 100 percent.

In response to making the second comparison, the virtual memory manager changes the pages size of combined page 425, third page 423, and fourth page 424 to a different page size, such as third page size 419 to form second combined page 426. Although first page size 417, second page size 418, and third page size 419 have pages sizes of 4, 8, and 16 Kbytes, respectively, these pages sizes may be any page size supported by the operating system to which they are associated.

Figure 5:
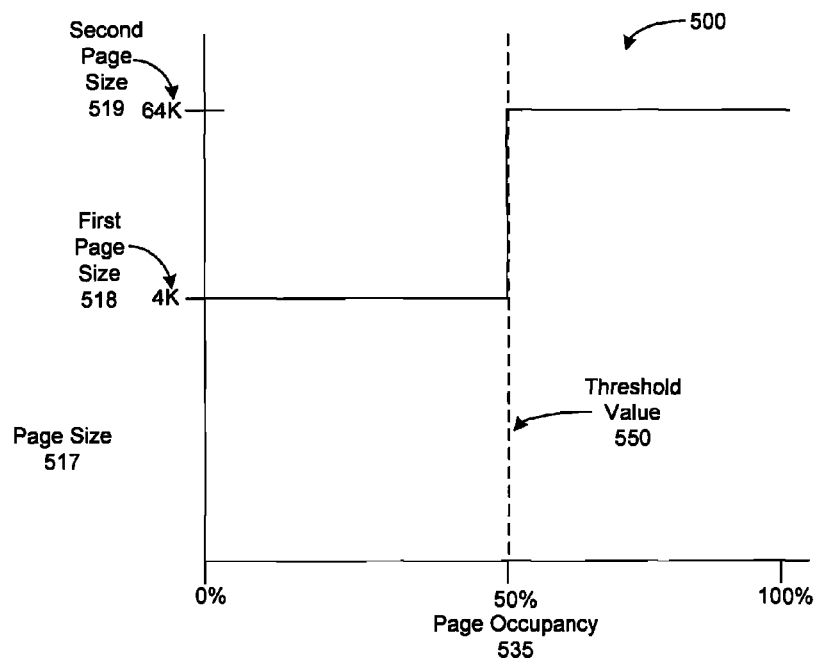
FIG. 5 is a graphical representation of a system for adjusting the page size in a virtual memory range in accordance with an illustrative embodiment.

With reference now to FIG. 5, a graphical representation of a system for adjusting the page size in a virtual memory range is depicted in accordance with an illustrative embodiment.

Specifically, graphical representation 500 is a graph of page size 517 as a function of page occupancy 535.

The set of pages in a virtual memory range, such as virtual memory range 320 in FIG. 3, which resides in primary memory, is called the page occupancy. In this example, page occupancy 535 is shown as a range of percentages on the x-axis. Specifically, page occupancy 535 is shown as a range of zero percent to 100 percent.

Page size 517 is depicted as having two possible values: 4 and 64 Kbytes. Page size 517 indicates the page size of pages in a virtual memory range, such as virtual memory range 320 in FIG. 3. In this example, page size 517 has only two page size values, 4 Kbytes and 64 Kbytes. However, in accordance with the illustrative embodiments, page size 517 may be any page size that is supported by an operating system, such as operating system 305 in FIG. 3.

Graphical representation 500 indicates that a virtual memory range contains pages having a first page size 518 of 4 Kbytes when the page occupancy 535 of the virtual memory range is zero percent. The state of the virtual memory range when page occupancy 535 equals zero percent may represent an initial state of the virtual memory range. For example, the operating system may have initialized the virtual memory range to have pages of first page size 518 because 4 Kbytes is the smallest page size supported by the operating system.

Each page that is referenced in the virtual memory range resides on a primary memory. The pages of the virtual memory range may be referenced by a process or application, such as application 325 in FIG. 3. The page occupancy of the virtual memory range increases as more pages in the virtual memory range are referenced and come to reside on the primary memory.

When the page occupancy 535 of the virtual memory range equals threshold value 550, first page size 518 is changed to second page size 519. FIG. 5 depicts threshold value 550 as 50 percent. However, threshold value 550 may be any value between zero percent and 100 percent.

Hence, in the example in which a user defined the threshold value, a system administrator could set a default value for threshold value 550 at 100 percent. Hence, the pages of the affected virtual memory range will only be increased from first page size 518 to second page size 519 when all of the pages in the virtual memory range reside in primary memory. Thereafter, when a user runs a performance-sensitive operation, the user may specify a more aggressive threshold value, 50 percent, so that the operating system increases first page size 518 to second page size 519 when 50 percent of the pages in the virtual memory range reside in primary memory.

Figure 6:
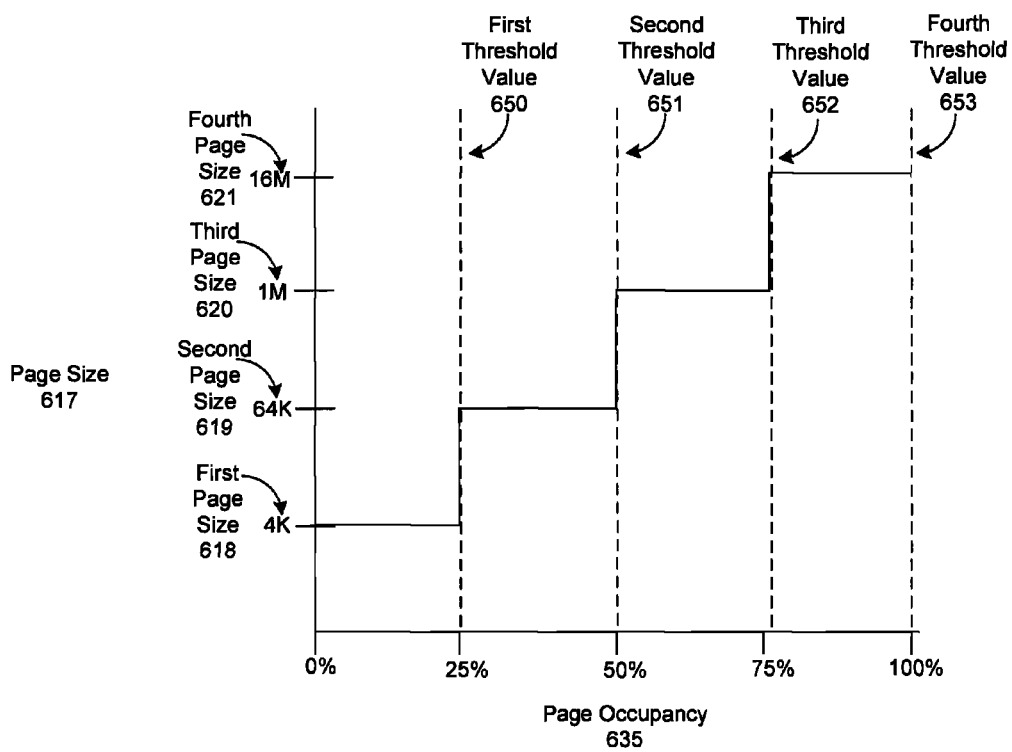
FIG. 6 is a graphical representation of a system for adjusting the page size in a virtual memory range in accordance with an illustrative embodiment.

With reference now to FIG. 6, a graphical representation of a system for adjusting the page size in a virtual memory range is depicted in accordance with an illustrative embodiment. Specifically, graphical representation 600 is a graph of page size 617 as a function of page occupancy 635.

FIG. 6 depicts a set of threshold values 650, 651, 652, and 653. Graphical representation 600 indicates that a virtual memory range contains pages having a first page size 618 of 4 Kbytes when the page occupancy 635 of the virtual memory range is zero percent. The state of the virtual memory range when page occupancy 635 equals zero percent may represent an initial state of the virtual memory range.

As the page occupancy 635 increases with each newly referenced page of the virtual memory range, page occupancy 635 reaches each of threshold values 650, 651, 652, and 653. Specifically, when page occupancy 635 of the virtual memory range equals first threshold value 650 of 25 percent, first page size 618 is changed to second page size 619 for the virtual memory range. When page occupancy 635 of the virtual memory range equals second threshold value 651 of 50 percent, second page size 619 is changed to third page size 620 for the virtual memory range. When page occupancy 635 of the virtual memory range equals third threshold value 652 of 75 percent, third page size 620 is changed to fourth page size 621 for the virtual memory range. Fourth page size 621 may also be increased to a larger page size when page occupancy 635 equals fourth threshold value 653 of 100 percent.

Although FIG. 6 depicts threshold values of 25 percent, 50 percent, 75 percent, and 100 percent, the threshold values in a set of threshold values may be any value between zero percent and 100 percent. Additionally, the threshold values may be expressed as a fraction or a number.

Figure 7:
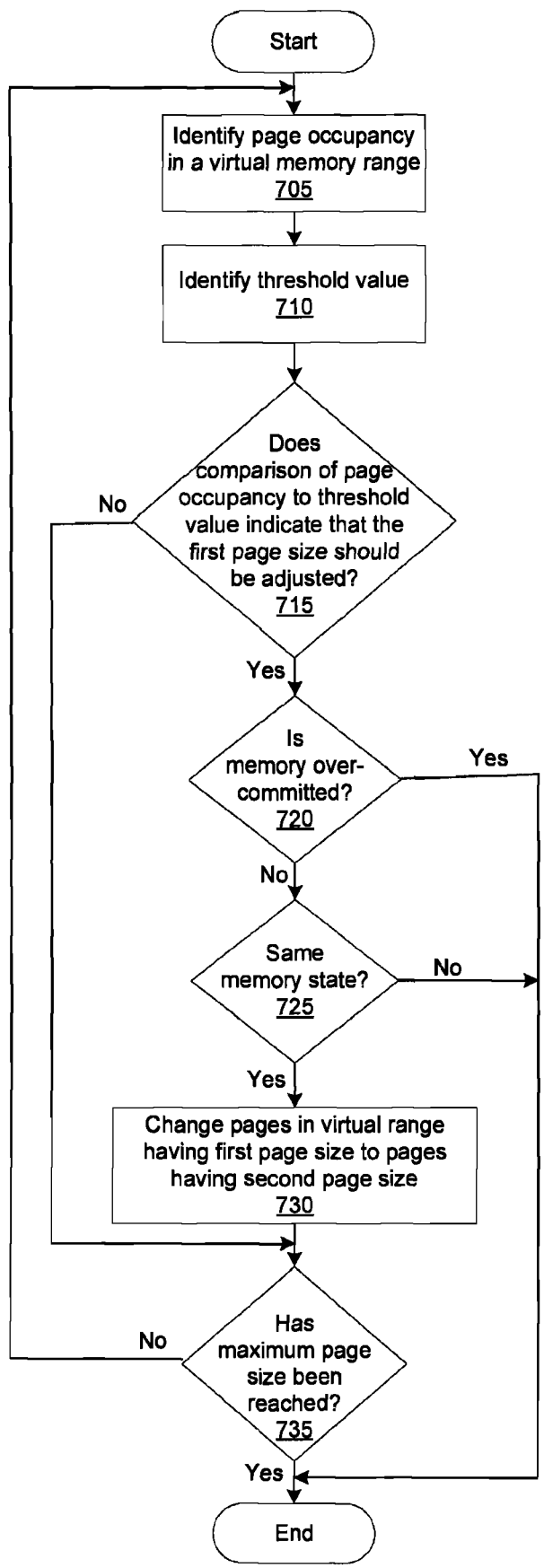
FIG. 7 is a flowchart illustrating a process for adjusting the page size in a virtual memory range in accordance with an illustrative embodiment.

With reference now to FIG. 7, a flowchart illustrating a process for adjusting the page size in a virtual memory range is depicted in accordance with an illustrative embodiment. The process illustrated in FIG. 7 may be implemented by an operating system, such as operating system 305 in FIG. 3.

The process begins by identifying a page occupancy in a virtual memory range (step 705). The page occupancy is a set of pages in the virtual memory range that reside on the primary memory, such as primary memory 335 in FIG. 3. The process identifies a threshold value (step 710).

The process makes a comparison of the page occupancy to the threshold value indicating whether a first page size of the virtual memory range should be adjusted (step 715). If the comparison indicates that the first page size should not be adjusted, then the process determines whether the maximum page size has been reached (step 735). An example of a maximum page size is the maximum page size supported by an operating system, such as operating system 305 in FIG. 3. If the maximum page size has been reached, the process terminates.

Returning to step 715, if the comparison indicates that the first page size should be adjusted, the process determines whether the primary memory is over-committed (step 720). If the primary memory is over-committed, then the process terminates.

If the primary memory is not over-committed, then the process determines whether the pages in the virtual memory range are in the same memory state (step 725). If the process determines that the pages in the virtual memory range are not in the same memory state, then the process terminates.

If the process determines that the pages in the virtual memory range are in the same memory state, then the process changes the page size of the pages in the virtual memory range from a first page size to a second page size (step 730). The process then determines whether the maximum page size has been reached (step 735). If the maximum page size has not been reached, then the process proceeds to step 705. If the maximum page size has been reached, the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer program product for adjusting a page size for a virtual memory range. In one embodiment, the process identifies a set of pages in the virtual memory range that reside on a primary memory to form a page occupancy. Each of the set of pages has a first page size. The process changes the first page size to a second page size in response to a comparison of the page occupancy to a threshold value indicating that the first page size should be adjusted.

In another embodiment, the second page size is larger than the first page size. In another example, the comparison of the page occupancy to the threshold value indicating that the first page size should be adjusted includes identifying that the page occupancy is equal to or greater than the threshold value. In another embodiment, the threshold value is a first threshold value in a set of threshold values. In this embodiment, the process changes the second page size to a different page size in response to a second comparison of the page occupancy to a second threshold value in the set of threshold values indicating that the second page size should be adjusted.

In one embodiment, the process for adjusting pages sizes in virtual memory is performed dynamically during runtime. Pages sizes are adjusted dynamically by adjusting page sizes in virtual memory ranges based on system conditions, such as the conditions of data processing system 300 of FIG. 3. The operating system selects an optimal page size while an application is executing. Hence, an application does not need to be executed multiple times for a page size to be selected, and the page size may be adjusted while the application is running.

In addition, dynamically adjusting a page size for a virtual memory range may be implemented to adapt to system conditions. If a system's primary memory is over-committed, page size may be either reduced or not changed at all. By reducing the page sizes, the operating system can minimize the amount of input/output due to paging because paging will be performed in smaller units.

Moreover, in one embodiment, page sizes in virtual memory are adjusted automatically without user intervention. In other words, no user input or application modification, such as re-compilation, is necessary. The operating system automatically changes the page size of virtual memory range to a larger page size based on application memory reference patterns. In addition, there are no binary compatibility impacts. The use of larger page sizes is transparent to an application and will have no functional impact on the application.

The illustrative embodiments work at the granularity of the pages sizes. Thus, a process's memory range may include any combination of different sizes. Hence, more granularity is provided than that provided by environmental variables or applications providing page size selection at the memory object level. In this manner, a user can control the aggressiveness of page promotion by allowing a user to indicate threshold values. The user may provide the operating system with input as to how to weigh an increased memory footprint against increased performance. The input may be implemented at a fine granularity, such as the process-level.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for adjusting a page size for a virtual memory range, comprising:
   identifying a set of pages in the virtual memory range that reside on a primary memory to form a page occupancy, wherein the set of pages has a first page size;
   responsive to a comparison of the page occupancy to a first threshold value in a set of threshold values indicating that the first page size should be adjusted, determining whether the set of pages have uniform page protections;
   responsive to a determination that the set of pages have uniform page protections, changing the first page size to a second page size larger than the first page size; and
   responsive to a second comparison of the page occupancy to a second threshold value in the set of threshold values indicating that the second page size should be adjusted, changing the second page size to a different page size.

2. The computer implemented method of claim 1, wherein the comparison of the page occupancy to the threshold value indicating that the first page size should be adjusted, further comprises:
   determining whether the page occupancy is equal to the threshold value; and
   responsive to a determination that the first page size is equal to the threshold value, dynamically adjusting the first page size to the second page size.

3. The computer implemented method of claim 1, wherein the comparison of the page occupancy to the threshold value indicating that the first page size should be adjusted, further comprises:
   determining whether the page occupancy is greater than the threshold value; and
   responsive to a determination that the first page size is greater than the threshold value, dynamically adjusting the first page size to the second page size.

4. The computer implemented method of claim 1, wherein the threshold value is a first percentage value, and wherein the page occupancy is a second percentage value.

5. The computer implemented method of claim 1, wherein the threshold value is a user-definable threshold.

6. The computer implemented method of claim 1, wherein the threshold value is 100 percent page occupancy.

7. A computer program product in a computer-readable medium storing computer-usable program code for adjusting a page size for a virtual memory range, the computer program product comprising:
   computer-usable program code for identifying a set of pages in the virtual memory range that reside on a primary memory to form a page occupancy, wherein each of the set of pages has a first page size;
   computer-usable program code, responsive to a comparison of the page occupancy to a first threshold value in a set of threshold values indicating that the first page size should be adjusted, for determining whether the set of pages have uniform page protections;
   computer-usable program code, responsive to a determination that the set of pages have uniform page protections, for changing the first page size to a second page size larger than the first page; and
   computer-usable program code, responsive to a second comparison of the page occupancy to a second threshold value in the set of threshold values indicating that the second page size should be adjusted, for changing the second page size to a different page size.

8. The computer program product of claim 7, wherein the comparison of the page occupancy to the threshold value indicating that the first page size should be adjusted, further comprises:
   computer-usable program code for identifying that the page occupancy is equal to the threshold value.

9. The computer program product of claim 7, wherein the comparison of the page occupancy to the threshold value indicating that the first page size should be adjusted, further comprises:
   computer-usable program code for identifying that the page occupancy is greater than the threshold value.

10. A data processing system comprising:
    a bus system;
    a memory connected to the bus system, wherein the memory includes a set of instructions; and
    a processing unit connected to the bus system, wherein the processing unit executes the set of instructions to identify a set of pages in the virtual memory range that reside on a primary memory to form a page occupancy in which each of the set of pages has a first page size; determine whether the set of pages have uniform page protections in response to a comparison of the page occupancy to a first threshold value in a set of threshold values indicating that the first page size should be adjusted;
    change the first page size to a second page size larger than the first page size in response to determination that the set of pages have uniform page protections; and
    change the second page size to a different page size in response to a second comparison of the page occupancy to a second threshold value in the set of threshold values indicating that the second page size should be adjusted.

11. The data processing system of claim 10, wherein the processing unit further executes the set of instructions to identify that the page occupancy is equal to the threshold value.

12. The data processing system of claim 10, wherein the processing unit further executes the set of instructions to identify that the page occupancy is greater than the threshold value.

13. The computer implemented method of claim 1, further comprising:
    responsive to a determination that the set of pages do not have uniform page protections, changing the first page size to a second page size smaller than the first page size.

14. The computer implemented method of claim 1, wherein the comparison of the page occupancy to a threshold value indicating that the first page size should be adjusted comprises comparing the page occupancy to a threshold value in a set of threshold values, wherein each threshold value in the set of threshold values is associated with a particular virtual memory range of an application.

15. The computer implemented method of claim 1, further comprising:
    responsive to receiving instructions from a user to revert to a default page size, changing a current page size of the set of pages to the default page size.

16. The computer implemented method of claim 1, further comprising:
    responsive to a determination that the primary memory is over-committed, preventing the changing of the first page size to the second page size larger than the first page size.

17. The computer implemented method of claim 5, wherein the threshold value is set by a user at a system-wide level.

18. The computer implemented method of claim 5, wherein the threshold value is set by a user at a process-wide level.

* * * * *